United States Patent [19]

Togashi

[11] 4,266,859
[45] May 12, 1981

[54] LIQUID CRYSTAL DISPLAY DEVICE

[75] Inventor: Seigo Togashi, Kawagoe, Japan

[73] Assignee: Citizen Watch Co., Ltd., Tokyo, Japan

[21] Appl. No.: 950,986

[22] Filed: Oct. 13, 1978

[30] Foreign Application Priority Data

Oct. 14, 1977 [JP] Japan .................. 52-123041
Oct. 15, 1977 [JP] Japan .................. 52-123779

[51] Int. Cl.³ .................................. G02F 1/133
[52] U.S. Cl. .................. 350/338; 350/339 D; 350/347 R; 350/349
[58] Field of Search ............ 350/338, 349 R, 339 D, 350/347

[56] References Cited

U.S. PATENT DOCUMENTS

| 3,612,654 | 10/1971 | Klein et al. | 350/339 |
|---|---|---|---|
| 3,736,047 | 5/1973 | Gelber et al. | 350/338 |
| 3,881,809 | 5/1975 | Ferguson et al. | 350/338 |
| 3,900,248 | 8/1975 | Nagasaki | 350/347 |
| 3,960,438 | 6/1976 | Bonne | 350/347 X |
| 3,984,176 | 10/1976 | Hirai et al. | 350/345 X |
| 4,026,637 | 5/1977 | Yamazaki | 350/338 X |
| 4,093,356 | 6/1978 | Bigelow | 350/347 X |
| 4,116,544 | 9/1978 | Soief | 350/338 X |

Primary Examiner—Edward S. Bauer
Attorney, Agent, or Firm—Holman & Stern

[57] ABSTRACT

A liquid crystal display cell of reflective dichroic type, having improved contrast over a wide range of viewing angles by comparison with previous cells of this type, due to the overall distance between the reflecting surface and the liquid crystal layer being reduced by incorporation of a reflection layer and light diffusion surface which are integral with a rear substrate of the cell, in which the rear substrate is composed of phase retarding means.

9 Claims, 11 Drawing Figures

LIQUID CRYSTAL DISPLAY DEVICE

This invention relates to reflection type liquid crystal display cells utilizing a dichroic nematic liquid crystal material, and in particular to methods whereby the contrast and light utilization efficiency of such display cells can be significantly improved by reducing the distance between the reflection surface and the liquid crystal layer.

At present, various types of liquid crystal display cells are being applied to a wide variety of electronic devices. Such cells are of various types, such as of dynamic scattering type, twisted nematic type, etc. The majority of such cells are of reflection type, in which incident light is passed through the cell once, reflected from a reflection plate provided at the rear of the cell, and then again passed out through the cell. Liquid crystal cells of the twisted nematic type are in particularly widespread use, due to the capability of such cells for operation at low drive voltages, and the low power required to drive them. However, it is necessary to utilize a polarizing plate in a twisted nematic type of display cell. This results in at least 50% of the incident light being always absorbed within the cell. Thus, the light utilization efficiency of such cells is low, so that the contrast which can be obtained is limited, and the overall appearance is rather dark.

Another type of liquid crystal cell utilizes a nematic liquid crystal material combined with a dichroic dye having directional anistropy properties. When an electric field is established between the electrodes of the display cell, the nematic liquid crystal molecules become aligned in a desired direction, and the dichroic dye molecules are thereby caused to become sympathetically aligned in the same direction. It is thereby possible to cause light passing through the portions of the display cell between the cell electrodes to be either left in an unpolarized state, polarized in one direction, or absorbed, due to the action of the dichroic dye molecules under the control of the voltage applied to the cell electrodes. Such a liquid crystal cell is generally referred to as being of guest-host type (G-H type), and usually incorporates a phase delay plate which produces a rotation of the direction of polarization of light passing through the cell. This phase delay plate is generally located behind the rear substrate of the cell, in front of the reflection surface, in the case of a reflection type display cell.

Theoretically, a guest-host type display cell can utilize 100% of the light incident upon it, since no light need be absorbed by a polarizing plate. This would, however, only be possible under ideal conditions. In the case of conventional designs of guest-host type liquid crystal cells, the contrast provided is very far from the optimum possible levels, i.e. the light utilization efficiency is far from the ideal values. One of the principal reasons for this is that, in a conventional design of guest-host type liquid crytal display cell, there is a substantial distance between the reflection surface and the liquid crystal layer. This is due to the fact that the polarizing plate is situated between the reflection surface and the rear substrate of the display cell, and that the polarizing plate and the reflection plate are discrete components, of substantial thickness relative to the thickness of the liquid crystal layer. As a result, part of the incident light which enters a bright portion of the display (i.e. a part of the display corresponding to cell electrodes which are activated by an applied voltage) is reflected out at an angle with respect to the reflection surface, which is treated so as to cause diffusion of the light. A proportion of this reflected light will pass out through a dark portion of the display (i.e. a part of the display which is outside the cell electrodes), thereby reducing the contrast of the display. This unwanted extraneous reflection can be reduced by reducing the distance between the reflection surface of the cell and the liquid crystal layer.

With a liquid crystal cell of guest-host type in accordance with the present invention, the reflection plate and phase delay plate are made integral components of the construction of the rear substrate of the display cell. This enables the distance between the reflection surface and the liquid crystal layer to be substantially reduced by comparison with conventional display cells of this type. A higher degree of contrast and better visibility even at large viewing angles can be obtained than has heretofore been possible with this type of display cell.

It is therefore an object of the present invention to provide an improved liquid crystal display cell of reflection type utilizing a dichroic nematic liquid crystal material.

More particularly, it is an object of the present invention to provide an improved liquid crystal display cell of reflection type utilizing a layer of dichroic nematic liquid crystal material and having a substantially reduced overall thickness.

Further objects, features and advantages of the present invention will be made more apparent by the following description, when taken in conjunction with the attached drawings, whose scope is given by the appended claims.

Figure 1:
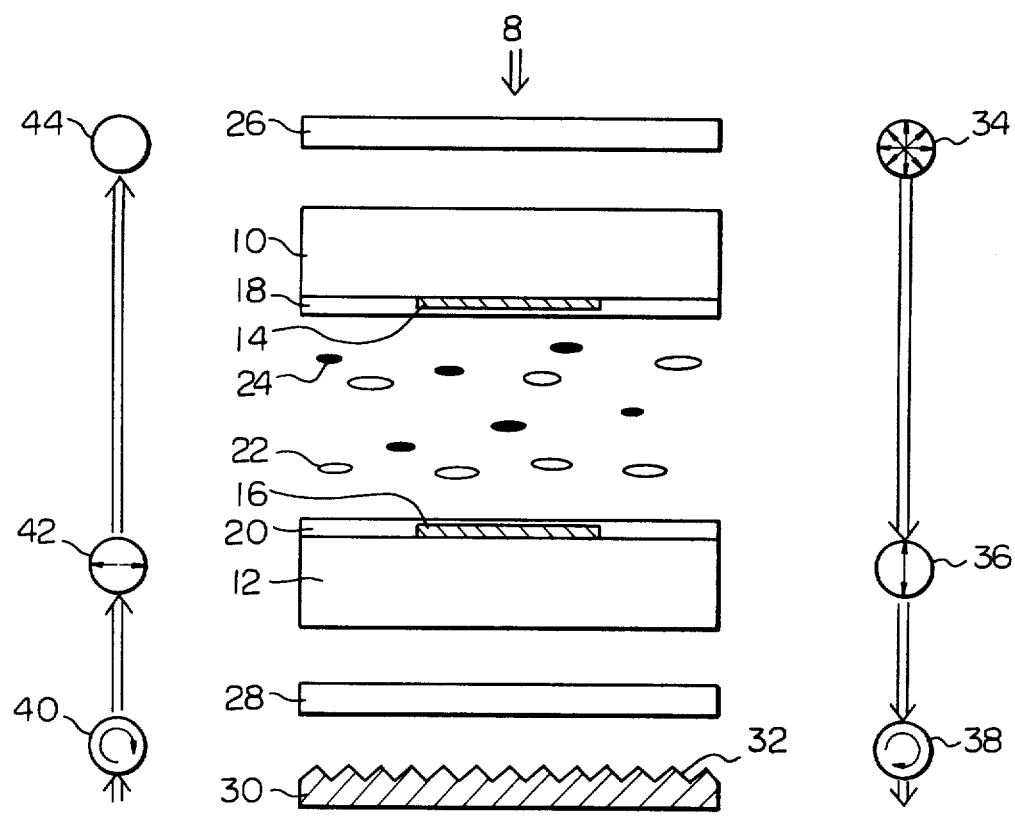
FIG. 1 is a simplified cross-sectional diagram of a conventional form of nematic dichroic liquid crystal display cell of reflection type, for the condition in which no voltage is applied to the cell electrodes.

Referring now to the drawings, FIG. 1 is a simplified cross-sectional diagram of conventional design of guest-host type liquid crystal display cell of reflection type, utilizing a nematic dichroic liquid crystal material, i.e. a mixture of a dichroic dye having directional anistropy properties with a nematic liquid crystal material having positive dielectric anistropy. FIG. 1 illustrates the internal condition of the cell when no voltage is applied between the cell electrodes. Numeral 10 indicates an upper transparent substrate and numeral 12 a lower transparent substrate. Numerals 14 and 16 indicate upper and lower transparent electrodes, deposited on the interior surfaces of upper and lower substrates 10 and 12 respectively. Alignment control layers 18 and 20 are formed over the transparent electrodes 14 and 16 respectively and over the internal surface areas of upper and lower substrates 10 and 12 which are not coupled by the electrodes 14 and 16. Alignment layers 18 and 20 cause molecules of a nematic liquid crystal material 22 to be homogeneously aligned with respect to the cell substrate plane in the absence of an electric field between the cell electrodes 14 and 16. Dichroic dye molecules 24 are mixed with the nematic liquid crystal material, and so are sympathetically aligned homogeneously with respect to the cell substrate plane in the absence of an electric field between the cell electrodes, by the action of adjacent nematic liquid crystal molecules 22. Numerals 26 and 28 denote an upper quarter-wave phase delay plate and a lower quarter-wave phase delay plate respectively. These serve to rotate the direction of polarization of light passing through them, as will be described hereinafter and will be referred to hereinafter as wave plates. Wave plate 26 is utilized in order to reduce the polarization effects of the incident light in a case where the incident light is polarized.

Numeral 30 indicates a reflector plate, having a slightly roughened surface finish 32 to produce diffusion of light reflected therefrom.

The operation of this display cell in the absence of a voltage applied to the cell electrodes 14 and 16 will now be described. Incident natural light, indicated by numeral 8, passes through wave plate 26 and upper substrate 10, then through the nematic dichroic liquid crystal layer composed of molecules 22 and 24. The incident natural light is unpolarized. However it becomes polarized in a direction normal to the substrate plane, i.e. in a direction normal to the direction of alignment of the liquid crystal molecules 22. This is due to the fact that components of the incident light which are not polarized in a direction normal to the direction of the liquid crystal molecules 22, and hence to the direction of alignment of the dichroic dye molecules 24, are absorbed by the dichroic dye molecules 24. The polarized light leaving the liquid crystal layer then passes through lower substrate 12 and through lower wave plate 28. In passing through lower wave plate 28, the light is delayed in phase by ¼ wavelength. Strictly speaking, this is only precisely true at one particular frequency of light. However, in practice, this does not seriously affect the operation of the display cell. This phase delay causes the light passed through the wave plate to be circularly polarized. The light is then reflected from diffusion surface 32 of reflector plate 30, causing the light to become circularly polarized in the opposite direction, as indicated by polarization diagrams 38 and 40. When the light again passes through wave plate 28 on its return path it becomes polarized in a direction parallel to the substrate plane, as indicated by polarization diagram 42. Wave plate 28 and reflector plate 30 therefore serve to rotate the direction of polarization of the light by 90°, effectively.

The light is now polarized in a direction which is parallel to the direction of alingment of the dichroic dye molecules 22, and so the light is almost completely absorbed on again passing through the nematic dichroic liquid crystal layer. In this condition, the display cell will, ideally, appear completely dark, since no light will be transmitted back from reflector plate 30.

Figure 2:
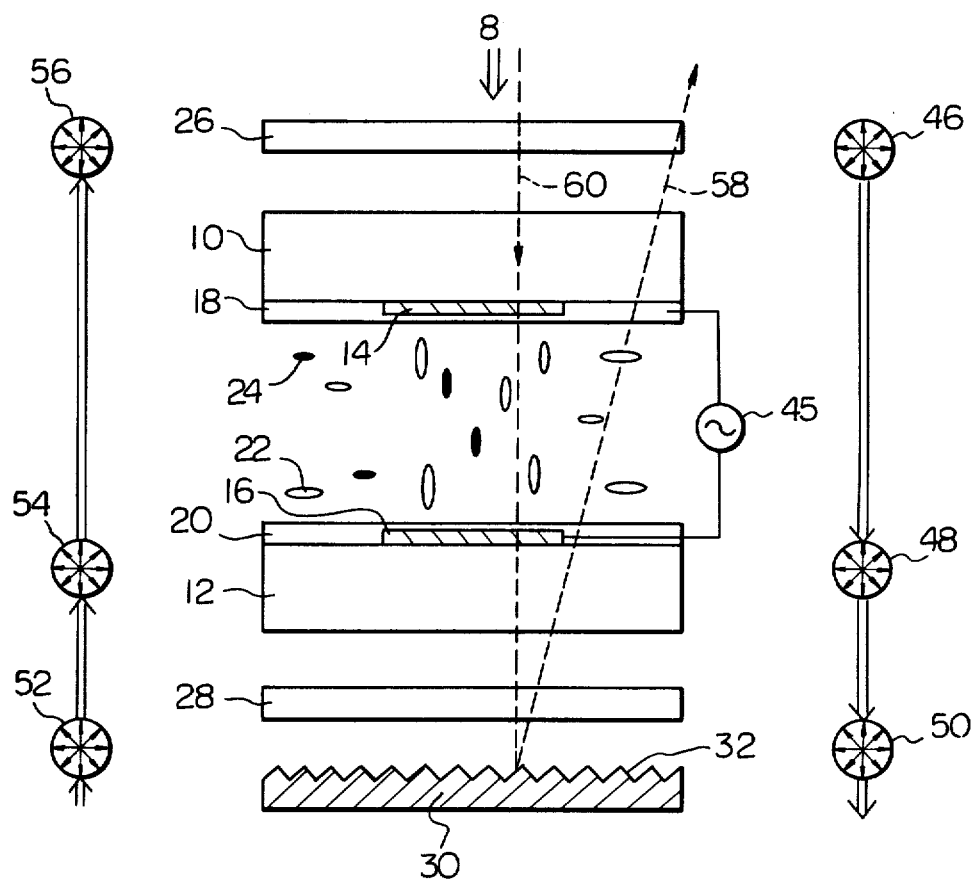
FIG. 2 illustrates the operation of the liquid crystal display cell of FIG. 1 for the condition in which a voltage is applied between the cell electrodes.

Referring now to FIG. 2, the effect of applying a voltage to cell electrodes 14 and 16 will now be described. When a voltage is applied from voltage source 45 to cell electrodes 14 and 16, an electric field is developed between the electrodes. This causes the nematic liquid crystal molecules 22 to become aligned in a direction substantially normal to the substrate plane. Dichroic dye molecules 24 which are situated between cell electrodes 14 and 16 therefore become sympathetically aligned in a direction normal to the substrate plane, i.e. homeotropically aligned, while crystal molecules 22 and dichroic dye molecules 24 which are located outside the space between electrodes 14 and 16 remain homogeneously aligned relative to the substrate plane. When incident natural light 8 now passes through upper substrate 10 and upper electrode 14, through the nematic dichroic liquid crystal layer, the light is not absorbed by the dichroic dye molecules, since the light is not polarized in a direction parallel to the direction of alignment of the dichroic dye molecules 24. The light therefore remains in an unpolarized state after passing through the nematic dichroic liquid crystal layer, and so is transmitted through wave plate 28, reflected from diffusion surface 32 of reflector plate 30, back through wave plate 28, and back through the nematic dichroic liquid crystal layer, without being absorbed by the dichroic dye molecules 24. The area of the display cell which is between electrodes 14 and 16 therefore appears bright by comparison with other areas. By utilizing appropriate patterns of electrodes 14 and 16 it is therefore possible to display numerals, letters, etc. in response to various combinations of control voltages applied to the cell electrodes.

With such a conventional form of liquid crystal cell, however, the degree of contrast obtained is far from the ideal level, particularly at large viewing angles. The reason for this is indicated by broken lines 58 and 60 in FIG. 2. Due to the diffusing action of surface 32, some of the light which passes through the cell, indicated by broken line 60, is reflected back at a different angle from that at which it impinges upon diffusion surface 32. A proportion of the light may be reflected back in the direction indicated by broken line 58, for example. As can be seen, this part of the light is not reflected back through the cell electrodes 14 and 16, but instead passes out through an adjacent area of the display cell which should, ideally, always appear dark. This phenomenon causes a reduction a cell contrast, particularly at large viewing angles. The degree to which this phenomenon occurs can be reduced by decreasing the distance between diffusion surface 32 and upper electrode 14. With a conventional form of nematic dichroic liquid crystal display cell, it is difficult to reduce this distance, since the wave plate 30 is a separate discrete element, and since substrate 12 must be of sufficient thickness to provide mechanical support for the display cell structure.

With a nematic dichroic liquid crystal display cell in accordance with the present invention, however, it is possible to reduce the distance between diffusion surface 30 and the liquid crystal layer to a significant degree, and thereby obtain a high degree of contrast and visibility even at high viewing angles.

Figure 3:
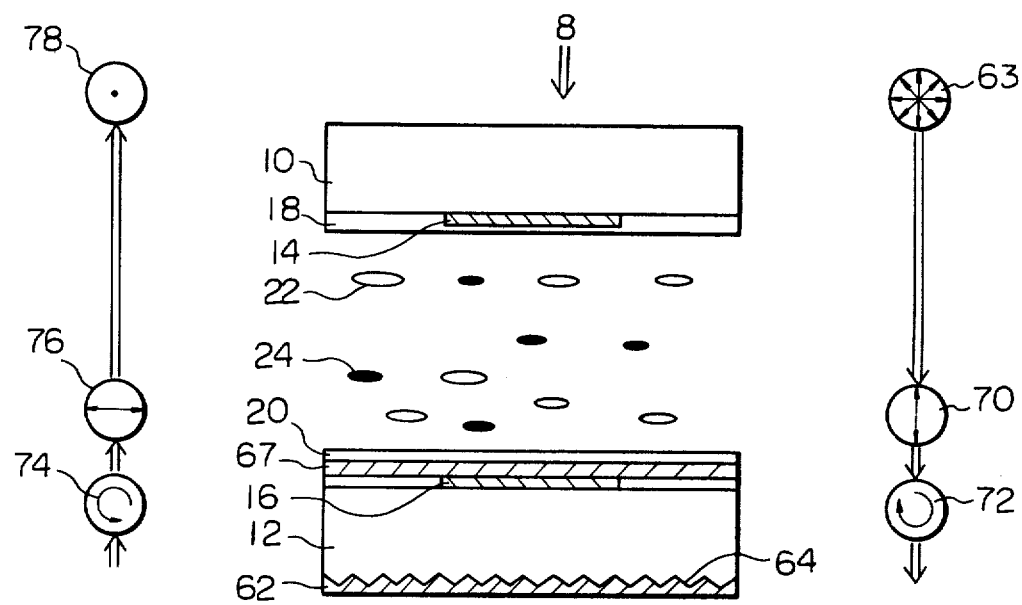
FIG. 3 is a simplified cross-sectional diagram of a first embodiment of a liquid crystal display cell in accordance with the present invention.

Referring to FIG. 3, a first embodiment of a liquid crystal display cell of reflection type using a nematic dichroic liquid crystal material is shown in simplified cross-section. FIG. 3 illustrates the internal condition of the display cell when no voltage is applied to the electrodes of the cell. In this embodiment, cell substrates 10 and 12 are made of glass, and have a thickness of the order of 0.5 mm. Upper and lower electrodes 14 and 16 consist of films of $InO_2$ formed by vacuum deposition on the substrate surfaces. Diffusion surface 64 is formed on the lower face of substrate 12, by a process such as honing with glass powder or treatment with fluoric acid. Reflection layer 62 is formed by direct evaporation of silver onto diffusion surface 64. Phase retarding layer or quarter-wave layer 67 may consist of a film of mylar or any other commercially available quarter-wave plate. Commercially available mylar has a relatively low phase retardation. However a higher degree of phase retardation can be obtained by heat treatment and stretching of the mylar. The mylar film used in this embodiment of the present invention was heated in a drier, and stretched to a thickness of 2 to 3 microns, for use as quarter-wave layer 67. Alignment layers 18 and 20 are formed by a rubbing process in this embodiment, and cause the liquid crystal molecules to be aligned substantially homogeneously with respect to the substrate plane, but at a slight uniform angle of tilt with respect to the plane.

The operation of this embodiment of the present invention is similar to that of the conventional form of nematic dichroic liquid crystal cell shown in FIGS. 1 and 2. With no voltage applied between cell electrodes 14 and 16, incident natural light 8 becomes polarized by passing through the nematic dichroic light crystal layer consisting of dichroic dye molecules 24 and nematic liquid crystal molecules 22 having positive dielectric anistropy. This condition is indicated by polarization diagram 70. This polarized light then becomes circularly polarized by passing through quarter wave layer 67, which performs the same function as a quarter-wave plate in a conventional display cell of this type. After reflection from diffusion surface 64 of reflection layer 62, the light is circularly polarized in the opposite direction, and so becomes polarized in a direction parallel to the substrate plane after passing through quarter-wave layer 67 again, as indicated by polarization diagrams 74 and 76. Since the light is now polarized in a direction parallel to the orientation of nematic dichroic liquid crystal molecules 22 and 24, which are aligned by alignment layers 18 and 20, it is absorbed by the dichroic molecules. In this condition, therefore, the display surface appears dark.

Figure 4:
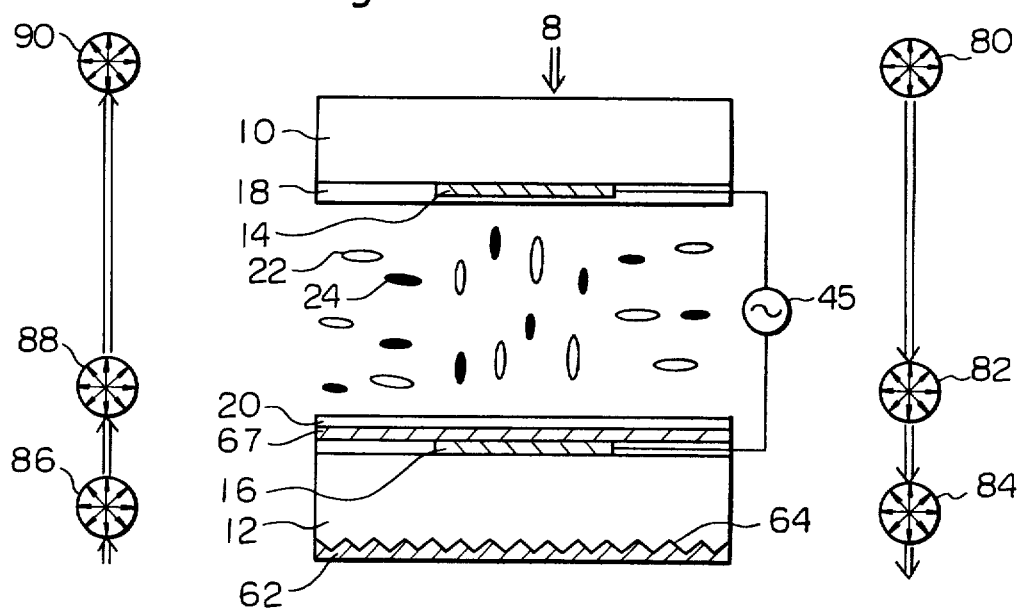
FIG. 4 illustrates the operation of the liquid crystal display cell shown in FIG. 3 for the condition in which a voltage is applied between the cell electrodes.

When a voltage is applied between cell electrodes 14 and 16 from voltage source 45, as shown in FIG. 4, the nematic liquid crystal molecules 22 become homeotropically aligned with respect to the cell substrate plane between electrodes 14 and 16. Dichroic dye molecules 24 therefore become sympathetically aligned homeotropically with respect to the substrate plane. Unpolarized natural light 8 is therefore not absorbed by the dichroic dye molecules 24 when passing through the portion of the nematic liquid crystal layer between cell electrodes 14 and 16, as indicated by polarization diagram 82, and is therefore completely reflected by diffusion surface 64. The light then passes back through quarter wave layer 67 and the nematic liquid crystal layer, and through upper substrate 10. It will be apparent that the distance between diffusion surface 64 of reflection layer 62 and the nematic liquid crystal layer is substantially reduced in this embodiment of the present invention, by comparison with a conventional design of dichroic nematic reflection type liquid crystal display cell. This is due to the diffusion surface 64 and reflection layer 62 being directly formed on a surface of lower substrate 12, and quarter wave layer 67 being in the form of an extremely thin film on the inner surface of lower substrate 12. A significant increase in display contrast over a wide range of viewing angles can therefore be obtained as explaine previously.

The nematic liquid crystal material used in the first embodiment of the present invention consists of a mixture of the following:

4-butyloxyl-4'-cyanobiphenyl: (17%)
4-pentoxyl-4'-cyanobiphenyl: (13%)
4-octoxy-4'-cyanobiphenyl: (17%)
4-pentyl-4'-cyanotaphenyl: (10%)
4-pentyl-4'-cyanobiphenyl: (43%)

The dichroic dye utilized consists of a violet dye whose composition is given by the following formula:

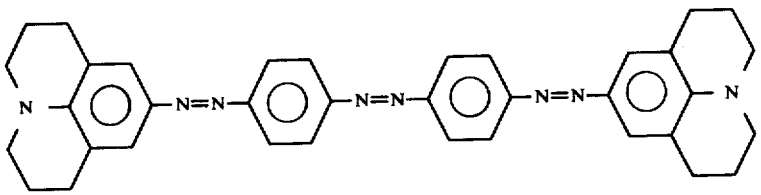

Figure 5:
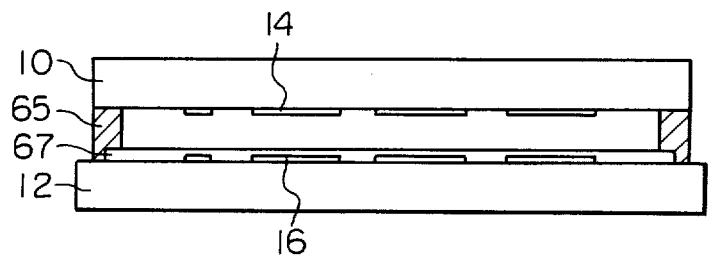
FIG. 5 is a simplified cross-sectional diagram of a practical embodiment of a liquid crystal cell corresponding to the first embodiment of the present invention shown in FIG. 3 and FIG. 4.
Figure 6:
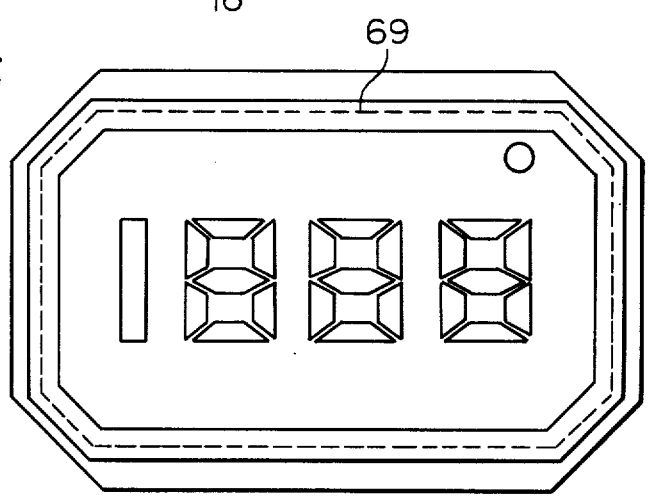
FIG. 6 is a plan view of the practical embodiment of a liquid crystal display cell shown in FIG. 5.

Referring now to FIG. 5, a simplified cross-sectional view is shown therein of a practical configuration for the first embodiment of the present invention shown in FIGS. 3 and 4. For simplicity, diffusion surface 64 and reflection layer 62 are omitted from FIG. 5. Numeral 65 indicates a sealant material. This performs two functions, namely to seal the nematic dichroic liquid crystal layer at the cell periphery, and to attach quarter wave layer 67 on the upper surface of lower substrate 12. It will therefore be apparent that a liquid crystal cell in accordance with the first embodiment of the present invention can be easily and economically manufactured. FIG. 6 is a plan view of the liquid crystal cell of FIG. 5, in which numeral 69 indicates the periphery of quarter-wave layer 67.

Figure 7:
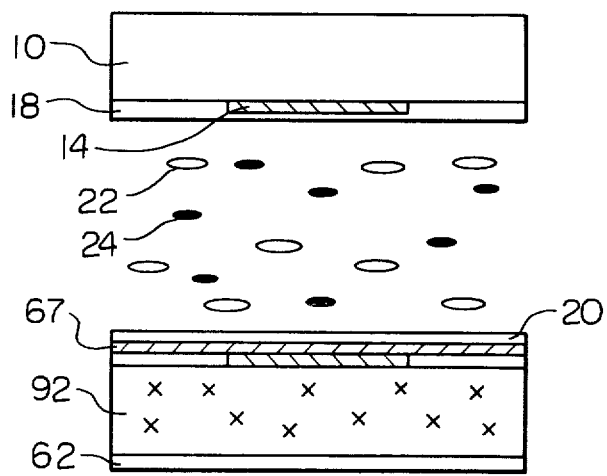
FIG. 7 is a simplified cross-sectional diagram of a second embodiment of a liquid crystal display cell in accordance with the present invention.

Referring now to FIG. 7, a second embodiment of a nematic dichroic liquid crystal display cell in accordance with the present invention is shown therein. As in the case of the first embodiment described above, numeral 62 indicates a reflection layer which is directly deposited upon the lower face of lower substrate 92, while numeral 67 indicates a quarter-wave layer consisting of material such as mylar film, and numerals 18 and 20 indicate alignment control layers for aligning nematic dichroic liquid crystal molecules 22 and 24 homogeneously with respect to the substrate plane. However, in the case of this second embodiment of the present invention, lower substrate 92 serves to perform diffusion of light passing through it, by being made of a semi-transparent material which produces diffusion of transmitted light. Surface treatment of the lower substrate is therefore not required, since a diffusion surface is not utilized. As in the case of the first embodiment, the distance between the surface of reflection layer 62 and the nematic dichroic liquid crystal layer is substantially reduced by comparison with conventional designs of such cell.

Figure 8:
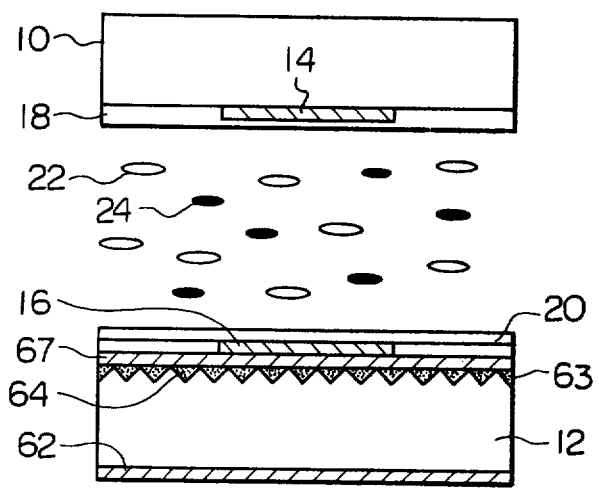
FIG. 8 is a simplified cross-sectional diagram of a third embodiment of a liquid crystal display cell in accordance with the present invention.

A third embodiment of the present invention is shown in FIG. 8. In this embodiment, light diffusion surface 64 is formed on the interior face of lower substrate 12, by treatment with fluoric acid. Quarter-wave layer 67 consists of mylar film, and is arranged on top of diffusion surface 64 by some suitable means such as an adhesive 63. Transparent electrode 16 is formed by ion plating a film of $SnO_2$ on top of quarter-wave layer 67. Reflection layer 62 is formed by depositing a layer of silver directly on the lower surface of substrate 12.

Figure 9:
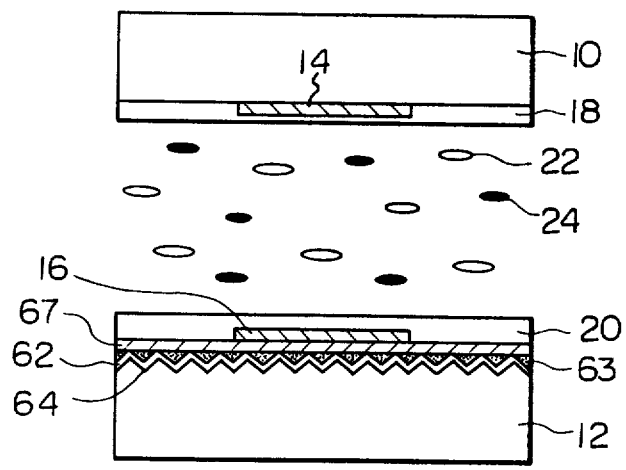
FIG. 9 is a simplified cross-sectional diagram of a fourth embodiment of a liquid crystal display cell in accordance with the present invention.

A fourth embodiment of the present invention is shown in FIG. 9. In this embodiment, a diffusion surface 64 is formed on the upper surface of lower substrate 12. A thin layer of silver is then formed on top of surface 64, by evaporative deposition. Due to the thinnes of the silver layer, the upper surface of reflecting layer 62 acts as a diffusion surface, since its contour closely follows the contour of surface 64. A quarter-wave layer 67 of mylar is arranged on top of reflection layer 62, and transparent electrode 16 formed on top of the quarter wave layer 67, as described for the third embodiment described above. It will be apparent that this fourth embodiment of the present invention enables the distance between the reflection layer 62 and upper electrode 14 to be considerably reduced, since the thickness of lower substrate 12 is not interposed therebetween.

Figure 10:
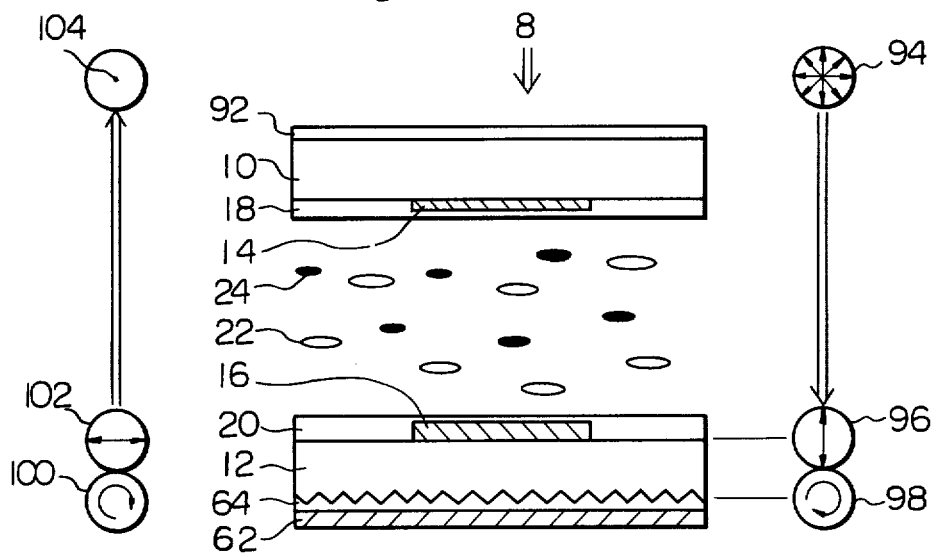
FIG. 10 is a simplified cross-sectional diagram of a fifth embodiment of a liquid crystal display cell in accordance with the present invention, for the condition in which no voltage is applied between the cell electrodes.

A fifth embodiment of the present invention will now be described, with reference to FIG. 10 and FIG. 11. In FIG. 10, numeral 92 indicates an anti-reflection coating, provided to improve display visibility by suppression extraneous reflections from the cell front surface. Anti-reflection layer 92 consists of a film of $MgF_2$ of 1400 Å thickness. In this embodiment of the present invention, lower substrate 12 also serves as a quarter-wave plate, thereby replacing the separate external quarter wave plate of a conventional cell of this type, and the quarter-wave layer used in the previously described embodiments of the present invention.

Substrate 12 is made of a material having transparent optical anistropy in this embodiment. The thickness d required for substrate 12 in this embodiment, for a substrate material having a phase retardance $J_p$ at a wavelength of light $\lambda$ is given by the formula:

$$d = (n + \tfrac{1}{4})\lambda/J_p \quad (1)$$

where n is an arbitrarily chosen integer. The optical axis of substrate 12 is arranged at a direction making an angle of 45° with the direction of alignment of liquid crystal molecules 22 and dichroic dye molecules 24, which are aligned homogeneously with respect to the substrate plane in the absence of a voltage applied to the cell electrodes 14 and 16. For this embodiment, quartz was used as the material for substrate 12. Since $J_p$ is 0.009 for quartz, then if n equals 3, substrate 12 must have thickness d equal to 180μ in order to achieve a phase retardation of one quarter wavelength at a light wavelength $\lambda$ of 5000 Å, from equation (1) given above.

In addition to quartz, it is also possible to utilize such anistropic crystal materials as saphire, calcite, KDP, ADP, etc. or a polymer material having an optical anistropic property to constitute substrate 12 in the fifth embodiment of the present invention. However quartz and saphire are particularly suitable for this purpose.

As in the case of the first, second, third and fourth embodiments of the present invention described above, upper substrate 10 is made of a transparent material such as glass, while transparent electrodes 14 and 16 are formed by a film of material such as $InO_2$ formed on the internal surfaces of substrates 14 and 16. Alignment control layers 18 and 20 cause nematic liquid crystal molecules 22 to be homogeneously aligned relative to the substrate plane, thereby causing dichroic dye molecules 24 to also become sympathetically aligned homogeneously. A diffusion surface 64 is formed on the lower surface of lower substrate 12 by a process such as treatment with fluoric acid. A layer of silver is formed on diffusion surface 64 by evaporative deposition, to form reflection layer 62.

The operation of the cell when no voltage is applied to electrodes 14 and 16 is as follows. Unpolarized incident light 8, as indicated by polarization diagram 94, passes through anti-reflection layer 92, upper substrate 10 and transparent electrode 18. In passing through the homogeneously aligned nematic liquid crystal layer constituted by dichroic dye molecules 24 and liquid crystal molecules 22, the component of the incident light which is not normal to the direction of alignment of the dichroic dye molecules is absorbed by these molecules, so that light polarized in a direction normal to the substrate plane passes out of the nematic dichroic liquid crystal layer, as indicated by polarization diagram 96. This light is then circularly polarized by passing through lower substrate 12, due to lower substrate 12 acting as a quarter-wave phase plate, as described above. Upon reflection from diffusion surface 64 on reflection layer 62, the direction of circular polarization of the light is reversed, as indicated by polarization diagram 100. The light is thus caused to become polarized in a direction parallel to the direction of alignment of dichroic dye molecules 24, by again passing through lower substrate 12, as indicated by polarization diagram 102, so that it is now absorbed by passing back through the nematic dichroic liquid crystal layer. In the absence of an applied voltage on the cell electrodes, therefore, the cell appears dark.

Figure 11:
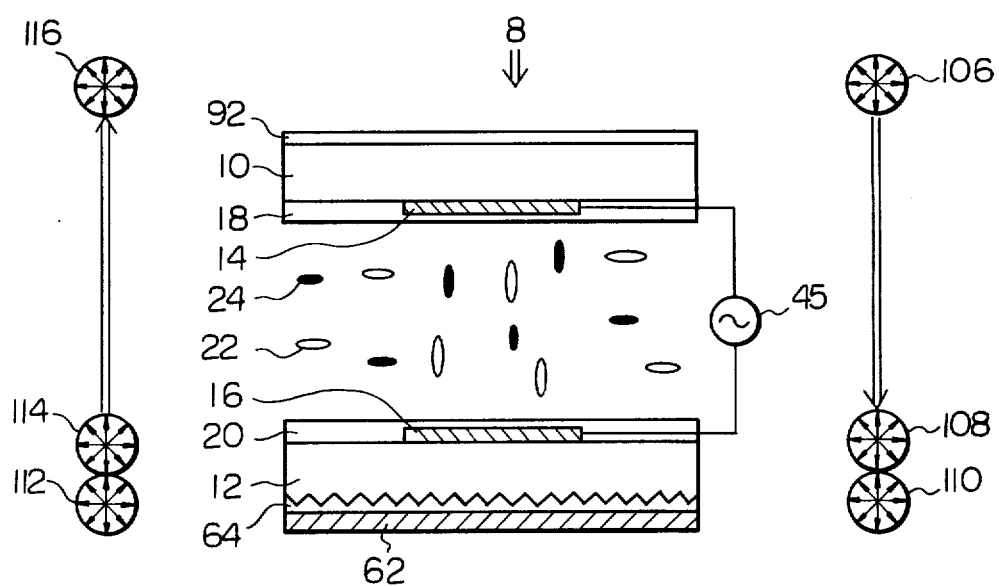
FIG. 11 is a diagram illustrating the operation of the liquid crystal display cell of FIG. 10, for the condition in which a voltage is applied between the cell electrodes.

FIG. 11 shows the internal condition of the liquid crystal cell of FIG. 10 when a voltage is applied from a voltage source 45 to cell electrodes 14 and 16, creating an electric field between these electrodes. Since in this case dichroic dye molecules 24 are maintained sympathetically aligned homogeneously with respect to the substrate plane between electrodes 14 and 16, by the adjacent liquid crystal molecules 14, incident light 8 remains unpolarized after passing through the nematic dichroic liquid crystal layer located between the cell electrodes. The light thus remains unpolarized after passing through lower substrate 12 and reflection from diffusion surface 64 of reflection layer 62, and so passes back out through the nematic liquid crystal layer and upper substrate 10 without being absorbed by dichroic dye molecules 24. The area of liquid crystal cell between electrodes 14 and 16 will therefore appear bright in contrast to other areas.

It will be apparent that this fifth embodiment of the present invention enables the thickness of a liquid crystal cell of reflection type using nematic dichroic liquid crystal material to be substantially reduced in comparison with conventional designs, and that in particular the distance between the surface of reflection layer 62 and upper electrode 14 can be significantly reduced, thereby ensuring greater contrast and visibility over a wide range of viewing angles. As compared with a convention liquid crystal cell of this type, having an overall thickness of the order of 2 mm, a liquid crystal cell in accordance with the fifth embodiment of the present invention can have a thickness of about 0.4 mm. Thus, a reduction in thickness by a factor of 1/5 can be obtained. Manufacture is also simplified, since it is not necessary to provide a separate quarter-wave plate or quarter-wave layer, as phase retardation is provided by lower substrate 12.

The combination of nematic liquid crystal material and dichroic dye material explicitly described for the first embodiment of the present invention is also applicable as the nematic dichroic liquid crystal material of the second, third, fourth and fifth embodiments of the present invention.

While the present invention has been shown and described with reference to particular embodiments, it should be noted that various other changes and modifications may be made without departing from the scope of the present invention. For example, while the light reflection layer has been shown and described as directly formed on the substrate, it should be noted that the light reflection layer may comprise a separate reflection layer attached to the substrate.

What is claimed is:

1. A liquid crystal display device comprising:
   a first substrate having a display area constituted by a first transparent electrode formed on a first surface thereof;
   phase retarding means having a display area constituted by a second transparent electrode formed on a first surface thereof;
   a layer of nematic dichroic liquid crystal material comprising a mixture of nematic liquid crystal molecules and dichroic molecules inserted between said first substrate and said phase retarding means;
   a first alignment layer disposed between said layer of nematic dichroic liquid crystal material and said first transparent electrode together with an area of said first surface of said first substrate outside said first transparent electrode, to cause said nematic liquid crystal molecules and dichroic dye molecules to align in a predetermined direction with respect to a plane of each of said first substrate and said phase retarding means;
   a second alignment layer disposed between said second transparent electrode together with an area of said first surface of said phase retarding means outside said second transparent electrode, to cause said nematic liquid crystal molecules and said dichroic dye molecules to align in said predetermined direction;
   light diffusion means formed on a second surface of said phase retarding means external to said layer of nematic liquid crystal molecules and dichroic dye molecules;
   light reflection means formed on said light diffusion means for reflecting light diffused from said light diffusion means; and
   said phase retarding means retarding the phase of light impinging upon said light reflection means by one quarter of a wavelength at a predetermined wavelength of said light, said light passing through said phase retarding means both before and after being reflected by said light reflection means.

2. A liquid crystal display device according to claim 1, in which said light reflection means comprises a layer of a reflecting material formed on said light diffusion means.

3. A liquid crystal display device according to claim 1, in which said phase retarding means comprises a plate of material having phase retarding properties with respect to light transmitted therethrough.

4. A liquid crystal display device according to claim 1, in which said light diffusion means is constituted by a light diffusion surface formed on said second surface of said phase retarding means.

5. A liquid crystal display device according to claim 3, in which said light diffusion means is constituted by a light diffusion surface formed on a second surface of said plate external to said layer of nematic liquid crystal molecules and dichroic dye molecules.

6. A liquid crystal display device according to claim 5, in which said light reflection means is constituted by a layer of reflecting material formed on said light diffusion surface of said plate.

7. A liquid crystal display device according to claim 1, further comprising an anti-reflection coating layer disposed on a second surface of said first substrate external to said layer of nematic liquid crystal molecules and dichroic dye molecules.

8. A liquid crystal display device according to any one of claims 1 and 2 or 5-7, in which said nematic liquid crystal material has positive dielectric anistropy.

9. A liquid crystal display device according to claim 8, in which said nematic liquid crystal material is caused to align substantially homogeneously with respect to the planes of said first substrate and said phase retarding means, at a slight angle of tilt with respect to said planes, by the action of said first and second alignment layers.

* * * * *